3,483,143
INORGANIC POLYMERS
James Ping King, Lansdale, Anthony Joseph Saraceno, Devon, and Burton Peter Block, Tredyffrin Township, Chester County, Pa., assignors to Pennsalt Chemicals Corporation, Philadelphia, Pa., a corporation of Pennsylvania
No Drawing. Filed Oct. 6, 1966, Ser. No. 584,651
Int. Cl. C08g 33/20
U.S. Cl. 260—2
11 Claims

ABSTRACT OF THE DISCLOSURE

Cross-linked polymers and copolymers involving a bridged (catenated) trivalent octahedral metal whereby the polymer backbone is entirely inorganic. The polymers and copolymers have high strength and are useful for conversion into tough fabricated articles.

---

In accord with the invention described by Saraceno in U.S. Patent 3,275,574 issued on Sept. 27, 1966, polymers and copolymers have been made which have the repeating units $M(a)(b)X_2$ wherein M is a trivalent octahedral metal, $a$ is a unidentate ligand having a charge of minus one (that is, it is a negative monovalent ion), $b$ is a neutral unidentate ligand, and X is a bridging group also with a charge of minus one. These solid polymers may be represented as compounds containing a plurality of the following recurring units:

wherein M, $a$, $b$ and X are defined above and the repeating units may be the same (homopolymers) or different (copolymers).

The trivalent octahedral metal M may be any of the numerous metals characterized by having a relatively unstable +2 valence which can be oxidized to the stable trivalent oxidation state and has in its trivalent state a coordination number of six (i.e. an octahedral spatial configuration). By a relatively unstable +2 valence state is meant that the metal in its divalent state as its simple salts is capable of being oxidized to its trivalent state by air at ambient temperature and at atmospheric pressure. Such metals will include those metals selected from the group consisting of chromium, iron, ruthenium, europium and ytterbium.

The catenating or bridging group (X in the above formula of the polymers) will have a charge of minus one and will comprise the anion of an acid. Preferably, the acid will be one having the structure $R_2M'(O)OH$ which is based on a group of metals and metalloids of Group V–B; that is, M' is an element of Group V–B having an atomic number greater than seven (e.g. phosphorus, arsenic, antimony and bismuth). M' is preferably phosphorus and the preferred bridging groups are the anions of phosphinic acids. Many of these acids are disclosed by Kosolapoff in his book "Organophosphorus Compounds" (John Wiley, 1950). It is evident that for the purpose of forming the polymer backbone by bridging the octahedral metal M atoms, only three valences of the M' atom in each of the bridging groups are used. Thus the remaining valences of the M' atom are satisfied with the two R groups as shown above in the acid formula $R_2M'(O)OH$. These R groups may be the same or different inert organic groups such as alkyl, aryl, alkoxy, or aryloxy. Preferably R will be a hydrocarbon alkyl or aryl group containing from one to ten carbon atoms such as, for example, methyl, ethyl, t-butyl, hexyl, octyl, phenyl tolyl xylyl naphthyl and the like. It will also be understood that the two bridging groups need not be the same.

The unidentate ligand $a$ which will have a charge of minus one, will be a negative inorganic group such as hydroxyl, nitrate, cyanate, thiocyanate, cyanide, halide, etc. The unidentate ligand $b$ is a neutral molecule such as water, ammonia, etc. The unidentate ligands $a$ and $b$ will be bonded to the trivalent octahedral metal and these ligands in combination serve to complete the coordination number of six and to give a polymer which is electrically neutral.

The compounds described above have properties which are typical of high polymers. They swell extensively in benzene or in chloroform to give highly viscous solutions which form transparent films and fibers. Films of the polymers plasticized with agents such as tricresyl phosphate and chlorinated polyphenyls have tensile strengths in the range of 100 to above 3000 p.s.i. and show excellent cohesiveness and flexibility. The fibers require no plasticization, being flexible and cohesive at room temperature. Rubbery gels have also been obtained which retain elastomeric properties under the plasticizing influence of solvents. A particularly surprising property of these polymers is their high thermal stability in that no melting of the polymers is observed up to temperatures of 400° C. and, in fact, even after heating fabricated parts to 700° C. the parts still retain structural strength.

The above described polymers, however, are limited where high tensile strength and/or high elongation is required. The above polymers require plasticization to eliminate brittleness (i.e. low elongation) and for certain applications the plasticized polymer is too soft and lacking in tensile strength.

It has now been found that the above described inorganic polymers may be vastly improved in tensile strength, elongation, and modulus by providing a polymer of the above structure which is cross-linked through replacement of the unidentate ligands $a$ and $b$ with a third bridging group from the octahedral metal M. Accordingly, the improved polymers of this invention are those having an inorganic backbone consisting of a triply bridged, trivalent, octahedral metal wherein two of said bridging groups are the anion of an acid $R_2M'(O)OH$ where R is selected from the group consisting of alkyl, aryl, alkoxy, and aryloxy, M' is an element selected from Group V–B having an atomic number greater than 7, and wherein the third bridging group is a multi-atom group having a terminal ionic valence and a terminal coordinate valence.

The polymer of the invention may be illustrated by structural formula as follows:

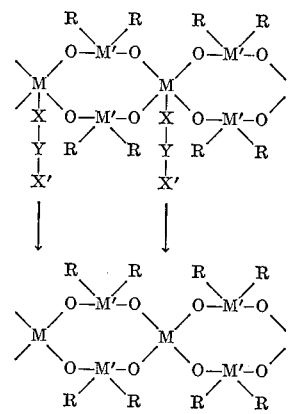

It will be understood that in the above formula $$-X-(Y)_n-X'\rightarrow$$

is the third multiatom bridging group linking two polymer chains. X is an atom having an ionic valence, X' is an atom capable of forming a coordinate bond, and Y is a linking atom or group between X and X'.

Examples of preferred crosslinking groups are the oxygen acids and of these the preferred acids are those oxygen acids of elements selected from the group consisting of boron, carbon, nitrogen, silicon, phosphorus, sulfur, arsenic, and tin. Such acids will contain OH and often carbonyl groups which will provide the terminal ionic and covalent bonds. Those valence bonds of the above elements not associated with the ionic and covalent oxygen atoms will be satisfied by numerous groups such as hydroxy, oxygen, amino, alkyl, alkoxy, aryl, aryloxy, and the like. Specific examples of these preferred crosslinking groups include the following:

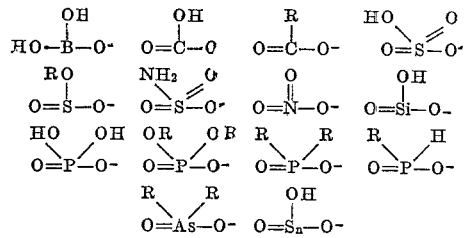

where R in the above structures is alkyl, aryl, alkoxy, aryloxy, etc. The most preferred bridging groups are derived from the phosphorus compounds having the structure

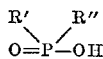

where R' is hydrogen, hydroxy, alkyl, alkoxy, aryl, or aryloxy and R" is hydroxy, alkyl, alkoxy, aryl, or aryloxy, the carbon containing groups having from 1 to about 12 carbon atoms. Specific preferred groups are exemplified by:

(CH$_3$)$_2$P(O)OH  (CF$_3$)$_2$P(O)OH
(C$_8$H$_{17}$)$_2$P(O)OH  (C$_7$F$_{15}$)$_2$P(O)OH
C$_6$H$_5$(H)P(O)OH  (C$_4$H$_9$O)$_2$P(O)OH
(C$_6$H$_5$)$_2$P(O)OH  Phosphoric acid
(C$_6$H$_5$)(CH$_3$)P(O)OH  Phenyl phosphinic acid
(C$_4$H$_9$)$_2$P(O)OH  Methyl phosphinic acid Preferred groups containing sulfur are exemplified by benzene sulfonic acid, p-toluene sulfonic acid, methyl sulfonic acid, ethyl hydrogen sulfate, sulfuric acid, and the like.

Preferred groups containing carbon are the lower aliphatic carboxylic and aromatic carboxylic acids such as acetic acid, propionic acid, benzoic acid, and the like.

It will be observed from the above structural formula for the novel polymer that the compositions of the invention have a highly ordered network or sheet structure. This is believed to contribute to the high structural strength and other properties of the polymers. For example, films made from these polymers have very high tensile strengths. The polymers are generally insoluble in all common slovents, have good thermal stability and films made from them may vary from soft to hard, but all are of good tensile strength.

The polymers of the invention may be made by several processes. A preferred process involves reaction of the polymers of U.S. 3,275,574 with the X—Y—X' moiety and this process is the subject of U.S. Ser. No. 584,685 filed of even date herewith. In that process the doubly bridged polymers or copolymers of U.S. 3,275,574 are reacted at about 80 to 200° C. in a solvent such as xylene, benzene, chloroform, o-dichlorobenzene and the like, with the X—Y—X' moiety, the amounts of reactants being taken so there is a ratio of essentially one X—Y—X' moiety for each octahedral metal M.

In another, less preferred technique the polymers and copolymers of the invention are made by reacting in a solvent system M(OM'R$_2$O)$_2$·THF (a tetrahydrofuran adduct disclosed in U.S. Ser. No. 479,631, filed Aug. 13, 1965, now U.S. Patent No. 3,384,604) with a bulky chelating agent. This technique is illustrated by Examples 1 and 2. Example 3 illustrates still another related process for preparation of the polymers.

It will be understood that copolymers of various types are part of the invention. The compounds may have different R groups in the M(OM'R$_2$O)$_2$ moiety, and different M(OM'R$_2$O)$_2$ moieties may be used to make up the polymer. Furthermore, more than one type of X—Y—X' moiety may be used and thus different cross-linking groups may be present in a polymer. These variations provide means to modify the properties of the polymer and make possible the preparation of a wide variety of polymers with practically tailor-made properties.

In order to further illustrate the invention, the following examples are given:

EXAMPLES

In the following examples several art accepted abbreviations are used in writing chemical formulae such as:

Me for CH$_3$—
Et for C$_2$H$_5$—
Pr for C$_3$H$_7$—
Bu for C$_4$H$_9$—
Ph for C$_6$H$_5$—
Ac for CH$_3$CO—

AcCHAc for CH$_3$COĊHCOCH$_3$

THF for Tetrahydrofuran

Example 1

A mixture of 4.60 g. (0.0106 m.) of

Cr(OP(Me)(Ph)O)$_2$·THF and 4.43 g. (0.0106 m.) of Ph$_2$P(O)NHP(O)Ph$_2$ in 125 ml. of o-dichlorobenzene is refluxed for 45 min. under a nitrogen atmosphere to give a substantial amount of green gelatinous material. The reaction product is allowed to cool to room temperature, and 125 ml. of CHCl$_3$ is added. The resulting gel suspension is filtered by gravity through a large medium-porosity glass filter. The gel is then washed with 350 ml. of CHCl$_3$, and a strong filmy residue forms on the filter disc after evaporation of the solvent (3.0 g.). This filmy residue is further dried in a 110° C. oven for several hours; it then analyzes quite well for polymeric [Cr(OP(Me)(Ph)O)$_3$]. A portion of this film has a tensile strength of over 8,000 p.s.i. The structural for this product is as follows:

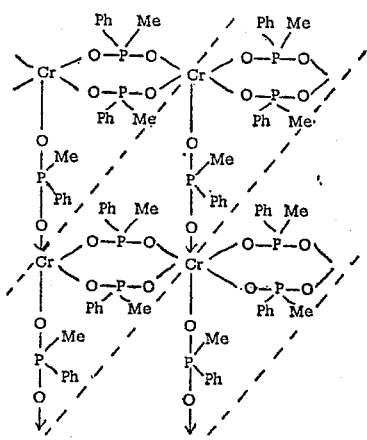

The dashed lines in the above structural configuration are present to indicate that the repeating unit of the polymer is [Cr(OP(Me)(Ph)O)$_3$].

Example 2

A mixture of 9.71 g. (0.0224 m.) of

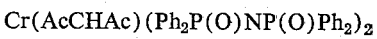
$Cr(OP(Me)(Ph)O)_2 \cdot THF$ and 9.35 g. (0.0224 m.) of $Ph_2P(O)NHP(O)Ph_2$ in 225 ml. of deaerated o-dichlorobenzene is refluxed for 1 hr. under a slow stream of nitrogen. The reaction product, a green gel suspension, is filtered by gravity through a medium porosity glass filter. The gelatinous residue is washed with 50 ml. of o-dichlorobenzene and dried by pumping under 0.1 mm. of Hg at 100° C. for several hours (5.9 g.). Calculated for $C_{21}H_{24}CrO_6P_3$: C, 48.7; H, 4.68; Cr, 9.7; P, 17.95. Found for the o-dichlorobenzene insoluble fraction: C, 47.37; H, 4.63; Cr, 9.25; P, 16.61.

Example 3

A mixture of 1.42 g. (0.00145 m.) of

$Cr(AcCHAc)(Ph_2P(O)NP(O)Ph_2)_2$ and 0.226 g. (0.00145 m.) of $Me(Ph)P(O)OH$ in 125 ml. of o-dichlorobenzene is refluxed for 7.5 hr. The reaction product is a gel suspension. It is diluted with an approximately equal volume of $CHCl_3$ and is filtered. The gel residue is washed with $CHCl_3$, and a strong film is formed on the filtered glass disc after complete evaporation of the solvent. The film is further dried in an oven at 100° C. for several hours; it then analyzes as $Cr(OP(Me)(Ph)O)_3$ Calculated for $C_{21}H_{24}CrO_6P_3$: C, 48.7; H, 4.68; Cr, 9.7; P, 17.95. Found for $CHCl_3$-insoluble fraction: C, 48.58; H, 4.61; Cr, 10.0; P, 16.67.

Example 4

A mixture of 0.99 g. of the polymer

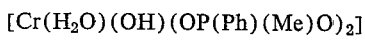
$[Cr(H_2O)(OH)(OP(Ph)(Me)O)_2]$ (0.0025 mole), 0.39 g. of $Me(Ph)PO_2H$ (0.0025 mole) and 25 ml. of orthodichlorobenzene is shaken in a mechanical shaker until a uniformly fine consistency is obtained. The mixture is cast into a petri dish maintained at 110° C. in an air oven. After 8–24 hours the solvent is evaporated leaving behind a cohesive, tough film which analyzes correctly for the polymer

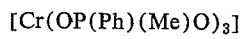
$[Cr(OP(Ph)(Me)O)_3]$

No OH absorption is seen in the infrared spectrum. The polymer film has the following mechanical properties: Tensile strength: 7–8000 p.s.i. percent E 1, Modulus $4 \times 10^5$ p.s.i. The film is brittle towards creasing.

Example 5

A mixture of 0.99 g. of

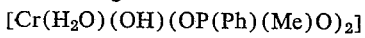
$[Cr(H_2O)(OH)(OP(Ph)(Me)O)_2]$ (0.0025 mole), 0.73 g. of $(C_8H_{17})_2PO_2H$ (0.0025 mole) and 25 ml. of ortho-dichlorobenzene is shaken on a mechanical shaker to uniform consistency and cast in a petri dish maintained at 110° C. After evaporation of the solvent, a tough, cohesive film of the polymer $[Cr(OP(Ph)(Me)O)_2OP(C_8H_{17})_2O]$ is left as a residue. The film has an approximate tensile strength of 4,000 p.s.i., and a percent elongation of 10–15. The film can be creased without fracture.

Example 6

A mixture of 1.66 g. of

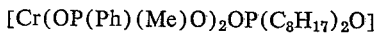
$[Cr(H_2O)(OH)(OP(C_8H_{17})_2O)_2]$ (0.0025 mole), 0.24 g. of $(CH_3)_2PO_2H$ (0.0025 mole) and 25 ml. of ortho-dichlorobenzene is stirred magnetically to a uniform consistency. The mixture is poured into an evaporating dish and thermostatted at 110° C. After the solvent has evaporated, a cohesive, tough film is left behind. The film has a tensile strength of up to 2,000 p.s.i., and an elongation at break of up to 100%. The modulus is $1.8 \times 10^4$ p.s.i. and 30° and $1.0 \times 10^4$ at 200° C. The material composition analyzes correctly for the polymer $[Cr(OP(C_8H_{17})_2O)_2(OP(CH_3)_2O)]$. The film can be repeatedly creased without fracture.

When p-toluenesulfonic acid is used instead of the dimethyl phosphinic in a procedure similar to that described above, a crosslinked polymer was obtained having higher elongation but lower tensile strength than that of the polymer crosslinked with dimethyl phosphinic acid.

Example 7

3.945 grams of $[Fe(H_2O)(OH)(OPPh(Me)O)_2]$ and 0.94 gram of $(CH_3)_2PO_2H$ are dispersed in 20 ml. of o-dichlorobenzene until a uniform dispersion results. The mixture is poured onto a glass casting dish maintained at 130° C. and heated until all solvent is driven off. A tough cohesive film or plaque is left behind which consists of $[Fe(OPPh(Me)O)_2(OP(CH_3)_2O)]$ in composition. This material has a tensile strength of over 5000 p.s.i.

Example 8

3.97 g. of $Cr(H_2O)(OH)(OPPh(Me)O)_2$ and 2.04 g. of $(CF_3)_2P(O)OH$ are dispersed in 20 ml. of o-dichlorobenzene until a uniform fine dispersion results. The mixture is poured onto a glass-casting dish maintained at 130° C. and heated until all solvent is driven off. A tough cohesive film is left behind which consists of the polymer 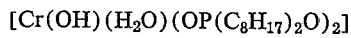 $[Cr(OPPh(Me)O)_2(OP(CF_3)_2O)]$. This film has a tensile strength of over 5000 p.s.i.

Example 9

1.1 g. of $H_2SO_4$ is dissolved in 10 ml. of tetrahydrofuran and 100 ml. of $C_6H_4Cl_2$ is added. To the emulsion thus obtained is added 8.3 g. of $[Cr(OH)(H_2O)(OP(C_8H_{17})_2O)_2]$ The mixture is stirred and heated on a stirrer hot plate for twenty minutes. The dark green solution which results is poured into a crystallizing dish which is placed in an oven overnight at 115° C. After the solvent is evaporated, a dark green material corresponding to the polymer $[Cr(OP(C_8H_{17})_2O)_2(OSO(OH)O)]$ is recovered. The material is pressed into a 2" x 1" x ⅛" specimen, by heating for two minutes, at 26° C. and at 3000 p.s.i. Tensile strength of the flexible molded plaque is significantly greater than that of the starting polymer.

Example 10

A mixture of 1.66 g. of

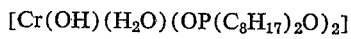
$[Cr(OH)(H_2O)(OP(C_8H_{17})_2O)_2]$ 0.24 g. of $Me_2POOH$, and 20 ml. of $C_6H_6$, is gently heated (235° C.) and stirred to a uniform consistency on a stirrer-hot plate. The mixture is stirred under a $N_2$ jet until most of the solvent evaporates. Final traces of solvent are removed by pumping under vacuum at room temperature. The residue polymer of structure

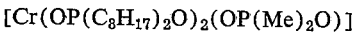
$[Cr(OP(C_8H_{17})_2O)_2(OP(Me)_2O)]$ is then ground to a fine powder and is ready for compression molding in a cylinder and piston type mold. The powder is pressed for ten minutes, at 100° C., 2000 p.s.i. to give a cohesive molded shape.

In this example the fine powder used for the molding operation is a mixture of the starting polymer and the $Me_2POOH$. When the mixture is placed in the mold, the heat and pressure effect reaction to generate the crosslinked, thermosetting polymer of the invention.

The above example is repeated with dimethylarsinic acid to yield the corresponding crosslinked polymer

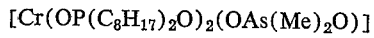
$[Cr(OP(C_8H_{17})_2O)_2(OAs(Me)_2O)]$

A film of this polymer is clear green, flexible, and quite tough.

Example 11

A mixture of 3.97 g. of

[Cr(OH)(H$_2$O)(OP(Me)PhO)$_2$]

2.90 g. of (C$_8$H$_{17}$)$_2$PO$_2$H, and 10 ml. of C$_6$H$_6$ is stirred and heated at 40° C. for eighteen hours to a uniform consistency on a stirrer-hot plate. The mixture is then treated the same as above. The recovered powder of the polymer of structure

[Cr(OPPh(Me)O)$_2$(OP(C$_8$H$_{17}$)$_2$O)]

is pressed for fifteen minutes at 150° C. and 1000 p.s.i. to give a cohesive molded plaque.

Example 12

3.3 grams of [Cr(H$_2$O)(OH)(OP(C$_8$H$_{17}$)$_2$O)$_2$] (0.005 mole) and 0.71 g. (0.005 mole) of (C$_6$H$_5$)(H)P(O)OH are added to 20 ml. of o-dichlorobenzene and shaken to a uniform dispersion. After 30 hours at 40–45° C. the mixture is poured onto a glass casting dish maintained at 115–120° C. After evaporation of the solvent a flexible film is left behind having the following properties: Tensile strength—1100 p.s.i., percent elongation—120. The film corresponds to the composition

[Cr(OP(C$_8$H$_{17}$)$_2$O)$_2$(OP(C$_6$H$_5$)(H)O)]

Example 13

Following the details of Example 12, 0.2 g. of H$_3$PO$_4$ (0.0017 mole) is used instead of phenyl phosphinic acid. The cross-linked polymer film has a tensile strength signficantly higher than a film obtained from the starting polymer.

Example 14

By following the procedure of Example 12, but using dibutyl phosphinic acid as the third bridging group and maintaining the cast mixture at 150° to 200° C., a cross-linked polymer is likewise obtained.

Example 15

Using benzoic acid as the third bridging group in accordance with the procedure of Example 12 gives a cross-linked polymer.

We claim:

1. A polymer having an inorganic backbone consisting of a triply bridged, trivalent, chromium atom wherein two of said bridging groups are the anions of an acid R$_2$M'(O)OH where R is selected from the group consisting of alkyl, aryl, alkoxy and aryloxy, M' is an element selected from Group V-B having an atomic number greater than 7, and wherein the third bridging group links two polymer chains and is derived from the anion of an oxygen acid of structure O=Y—O$^-$ where Y is an element selected from the group consisting of boron, carbon, nitrogen, silicon, phosphorus, sulfur, arsenic and tin and where the valence bonds of Y not associated with the oxygen atoms are satisfied by a member selected from selected from the group of hydrogen, hydroxy, oxygen, amino, alkyl, alkoxy, aryl, aryloxy and fluorocarbon.

2. A polymer as in claim 1 wherein all of said three bridging groups are the anions of R$_2$P(O)OH where R is a member of the group consisting of alkyl and aryl radicals containing from one to ten carbon atoms.

3. A polymer as in claim 2 wherein the bridging groups are derived from methylphenylphosphinic acid.

4. A polymer as in claim 1 wherein two of said bridging groups are derived from methylphenylphosphinic acid and the third bridging group is derived from dimethylphosphinic acid.

5. A polymer as in claim 1 wherein two of said bridging groups are derived from methylphenylphosphinic acid and the third bridging group is derived from dioctylphosphinic acid.

6. A polymer as in claim 1 wherein the third bridging group is derived from an acid of phosphorus of structure

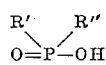

where R' is hydrogen, hydroxy, alkyl, alkoxy, aryl or aryloxy, and R'' is hydroxy, alkyl, alkoxy, aryl, or aryloxy.

7. A polymer as in claim 1 where the third bridging group is derived from phenylphosphinic acid.

8. A polymer as in claim 1 where the third bridging group is derived from dibutylphosphinic acid.

9. A polymer as in claim 1 where the third bridging group is derived from phosphoric acid.

10. A polymer as in claim 1 where the third bridging group is derived from benzoic acid.

11. A polymer as in claim 1 wherein the third bridging group is derived from an oxygen acid of arsenic.

References Cited

UNITED STATES PATENTS 3384,605  5/1968  Saraceno _____ 260—2

FOREIGN PATENTS 1,018,456  1/1966  Great Britain.

OTHER REFERENCES

Podall et al., "Jour. Polymer Science," Part B, September 1963, pp. 457–459.

SAMUEL H. BLECH, Primary Examiner

U.S. Cl. X.R.

260—47, 79.3